(12) United States Patent
Kawakami et al.

(10) Patent No.: US 7,016,538 B2
(45) Date of Patent: Mar. 21, 2006

(54) IMAGE PROCESSOR FOR DETECTING SPECIFIED PATTERN

(75) Inventors: Chiho Kawakami, Tondabayashi (JP); Akira Murakawa, Toyonaka (JP); Hirotomo Ishii, Toyonaka (JP)

(73) Assignee: Minolta Co., Ltd., Osaka (JP)

( * ) Notice: Subject to any disclaimer, the term of this patent is extended or adjusted under 35 U.S.C. 154(b) by 839 days.

(21) Appl. No.: 09/842,674

(22) Filed: Apr. 27, 2001

(65) Prior Publication Data
US 2002/0001095 A1    Jan. 3, 2002

(30) Foreign Application Priority Data

Apr. 27, 2000  (JP)  .............................. 2000-127530
Apr. 27, 2000  (JP)  .............................. 2000-127536

(51) Int. Cl.
*G06K 9/46*   (2006.01)

(52) U.S. Cl. ..................... 382/203; 382/221; 345/441; 358/3.06

(58) Field of Classification Search ................ 382/108, 382/112, 113, 135–138, 140, 162, 165, 168, 382/169, 175, 182, 193–203, 210, 232, 243, 382/241, 260, 274, 276, 321, 305, 221; 345/605, 345/698, 441; 358/3.06, 497; 348/159, 348/161; 235/462, 462.02
See application file for complete search history.

(56) References Cited

U.S. PATENT DOCUMENTS

| 4,198,656 | A | * | 4/1980 | Mathisen | 348/159 |
| 4,855,772 | A | * | 8/1989 | Hashimoto et al. | 396/410 |
| 5,515,451 | A | * | 5/1996 | Tsuji et al. | 382/135 |
| 5,625,768 | A | * | 4/1997 | Dye | 345/441 |
| 5,784,180 | A | * | 7/1998 | Sakai et al. | 358/501 |
| 5,796,869 | A | * | 8/1998 | Tsuji et al. | 382/203 |
| 6,167,163 | A | * | 12/2000 | Fukushima | 382/260 |
| 6,643,400 | B1 | * | 11/2003 | Murakawa et al. | 382/195 |
| 6,695,209 | B1 | * | 2/2004 | La | 235/462.2 |

FOREIGN PATENT DOCUMENTS

| JP | 5-85158 | 11/1993 |
| JP | 11-053539 | 2/1999 |
| JP | 11-108631 | 4/1999 |

* cited by examiner

*Primary Examiner*—Sanjiv Shah
*Assistant Examiner*—Seyed Azarian
(74) *Attorney, Agent, or Firm*—Buchanan Ingersoll PC

(57) ABSTRACT

In an image processor for detecting a circular pattern in an image, input image data is binarized to provide bi-level image data, and pixels having a predetermined value is counted in a block of a polygon having n vertices in the bi-level image data, wherein n denotes a natural number equal to or larger than eight. Then, it is decided, based on a number of the pixels having the predetermined value counted by the counter, whether the circular pattern is detected in the image or not. A detection window is used to detect the specified pattern. The detection window is moved successively by a predetermined number of pixels, in a direction from a side towards the center. The moving distance and direction are controlled based on the result of scan.

22 Claims, 15 Drawing Sheets

IMAGE PROCESSOR FOR DETECTING SPECIFIED PATTERN

This application is based on applications Nos. 2000-127530 and 2000-127536 filed in Japan, the contents of which are hereby incorporated by reference.

BACKGROUND OF THE INVENTION

1. Field of the Invention

The present invention relates to image processing for detecting a specified pattern such as a circular pattern in an image.

2. Description of Prior Art

Recently, a color copying machine provides more functions with improved performance, and counterfeit of paper money or the like becomes a big problem. Then, effective countermeasures for preventing counterfeit have been researched. In one of the countermeasures, specified patterns have been embedded in a design in a paper money or the like. When an image is read in copying operation in a copying machine, the scanned image is analyzed. When a specified pattern is recognized in the image, normal image forming is forbidden.

Input or output apparatuses such as a scanner or a printer available recently can process a large amount of image data such as high resolution data at higher speed. Then, it is required to cooperate with them in order to detect specified patterns in real time. Further, an image processor is demanded to detect the specified patterns in a shorter time.

A circular pattern is used as one of the specified patterns. The detection of a circular pattern is described, for example, in Japanese patent laid open publication 11-198631/1999, wherein specified pixels in a circular area are counted. However, the counting of the specified pixels in a circular area is more complicated than that in a rectangular area. For a circular pattern as the specified pattern, an image processor is demanded to detect it at higher speed.

SUMMARY OF THE INVENTION

An object of the present invention is to perform image processing for detecting a specified pattern such as a circular pattern at a higher speed and at a higher precision.

In one aspect of the invention, in an image processor for detecting a circular pattern in an image, a binarization unit binarizes input image data to provide bi-level image data, and a counter counts pixels having a predetermined value in a block of a polygon having n vertices in the bi-level image data, wherein n denotes a natural number equal to or larger than eight. Then, a controller decides, based on a number of the pixels having the predetermined value counted by said counter, whether the circular pattern is detected in the image or not.

In a further aspect of the invention, in an image processor for detecting a specified pattern in an image, a controller sets a detection window to detect the specified pattern and moves the detection window successively by a predetermined number of pixels, and a detector scans the image from each side of the detection window towards the center thereof to detect a rim of the specified pattern. The controller decides a width of scan until the detector detects the rim of the specified pattern, in a direction in correspondence to the moving direction of the detection window. Then, the controller changes a moving distance of the detection window based on the decided width of scan.

In a different aspect of the invention, in an image processor for detecting a specified pattern in an image, a controller sets a quadrilateral detection window to detect the specified pattern and moves the detection window successively by a predetermined number of pixels, and a detector scans the image from each side of the detection window towards the center thereof to detect a rim of the specified pattern. The detector detects the rim of the specified pattern first in a moving direction of the detection window and next in a direction vertical to the moving direction.

An advantage of the present invention is that a specified pattern can be detected at higher speed and at higher precision.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
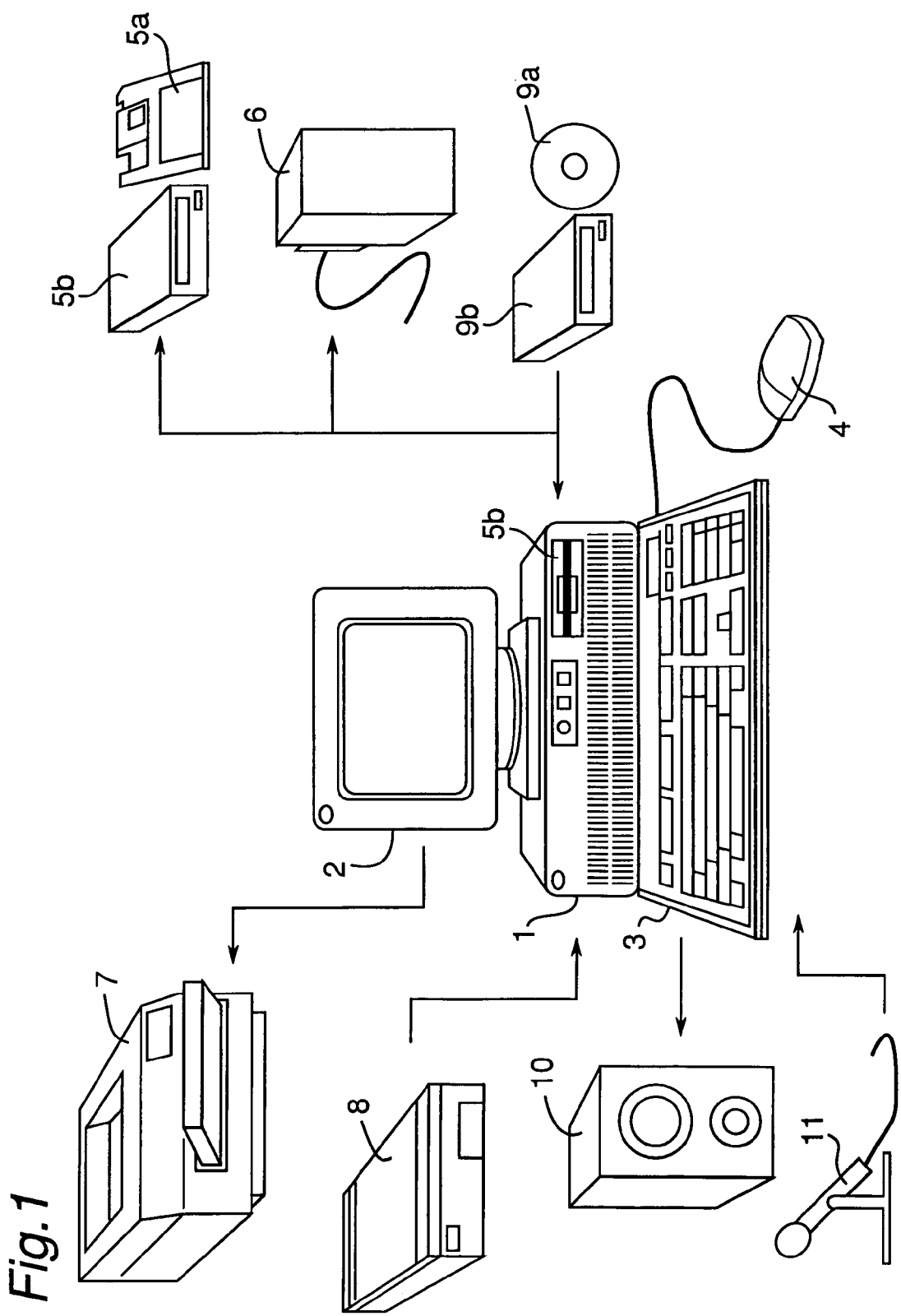
FIG. 1 is a diagram of an image processor according to a first embodiment of the invention.

Referring now to the drawings, wherein like reference characters designate like or corresponding parts throughout the several views, FIG. 1 shows an image processor (hereinafter referred to as system) according to a first embodiment of the invention schematically. The system has a controller 1 which has a central processing unit (hereinafter referred to as CPU) to control the entire system. The controller 1 has a display device 2 for displaying images, characters or the like, and a keyboard 3 and a mouse 4 for inputting data and instructions. A flexible disk 5a, a hard disk (not shown) and a CD-ROM 9a are used as recording media, and a flexible disk drive 5b, a CD-ROM drive 9b and a hard disk drive 6 are provided therefor. Further, the controller 1 is connected to a printer 7 for printing text data, an image or the like, a scanner 8 for acquiring image data, a speaker 10 for generating sound, and a microphone 11 for receiving sound.

Figure 2:
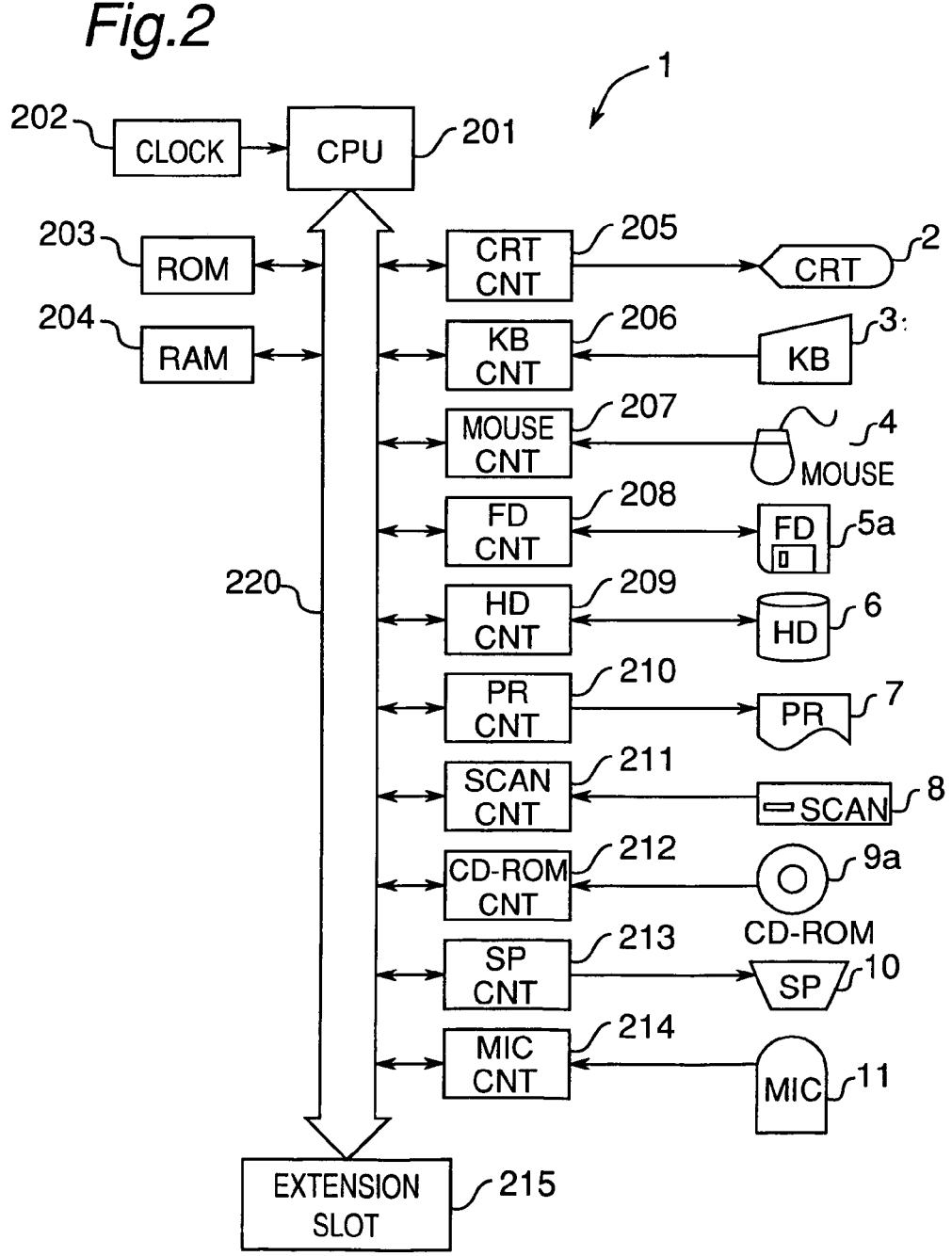
FIG. 2 is a schematic block diagram of a part of the image processor including a controller thereof.

FIG. 2 shows a structure of the controller 1. The CPU 201 is connected via a data bus 220 to a read only memory (ROM) 203 for storing a program to control the system or the like, and to a random access memory (RAM) 204 for storing the program or the like temporarily. Further, CPU 201 is connected via the data bus 220 to a display controller 205 for displaying images or characters in the display device 2, to a keyboard controller 206 for transmitting key-inputs from the keyboard 3, to a mouse controller 207 for transmitting input signal from the mouse 4, to a flexible disk drive controller 208 for accessing the flexible disk drive 5b, to a hard disk drive controller 209 for accessing the hard disk drive 6, to a printer controller 210 for controlling the printer 7, to a scanner controller 211 for controlling the scanner 8, to a CD-ROM controller 212 for controlling a CD-ROM drive 9b, to a speaker controller for controlling the speaker 10 and to a microphone controller 213 for controlling the microphone 11. The CPU 201 is connected to a clock circuit 202 for generating reference clock signals for operating the system. Further, it has an extension slot 215 for connecting an extension board.

In this system, a program for image processing is stored in a recording medium such as the ROM 203. However, the program or a part thereof may be stored in a recording medium such as a flexible disk 5a, a hard disk or a CD-ROM 9a. When necessary, the program is read therefrom and written to the RAM 204. A magneto-optical disk or the like may also be used as a storage medium. The scanner 8 is used as a device for inputting image data, but a different data input device such as a still video camera or a digital camera may also be used. Further, by connecting a network board to the extension slot 215, a program or image data may be received through a network.

Figure 3:
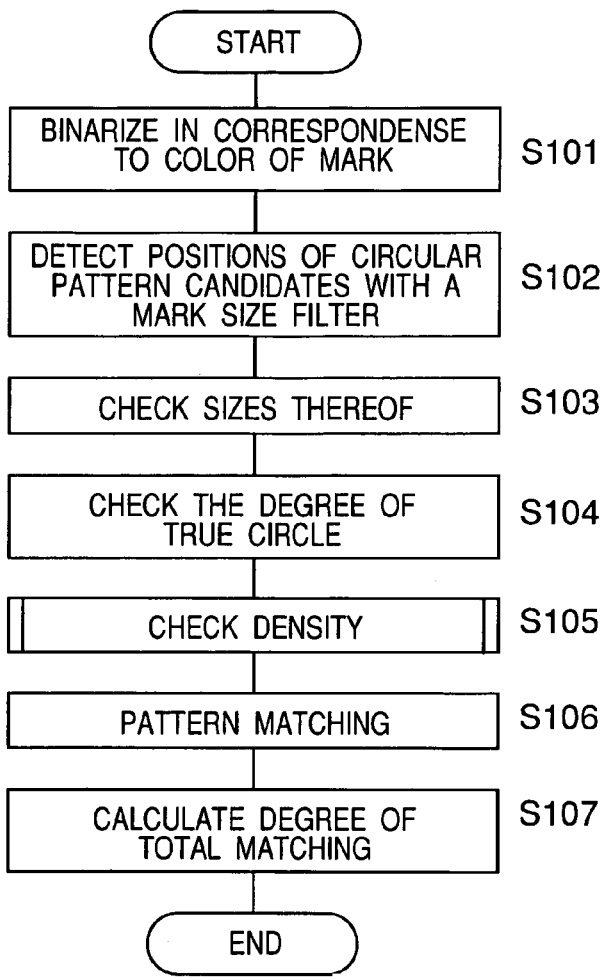
FIG. 3 is a flowchart of a main routine of the controller.

FIG. 3 shows a flowchart of a main routine executed by the CPU 201 in this system. The input image data processed by this system are 8-bit (256-gradation) density data of red (R), green (G) and blue (B). The image data are received from various input means as shown in FIG. 2 and, if necessary, are subjected to preprocessing such as conversion of resolution or change in modification factor. At step S101, image data are subjected to binarization for labeling pixels with respect to the color of a circular pattern (mark) to be detected. In the binarization, if the density value of a pixel is within a predetermined reference density range in the image on the color of the circular pattern, the pixel is decided to be an on-pixel having value of one, otherwise it is decided to be an off-pixel having value of zero. Next, the position of a circular pattern candidate is detected at step S102. The following steps are performed to check whether the detected candidate is the true circular pattern to be detected. At step S103, the detected circular pattern candidate is checked on vertical size, horizontal size and ratio of the vertical size to horizontal one. Next, at step S104, it is checked whether there are pixels having predetermined values at a plurality of points on a circle and outside the circle of the circular pattern candidate. Hereinafter a pixel having a predetermined value, that is, an on-pixel or an off-pixel is referred to as a specified pixel. Next, at step S105, density check is performed to count the specified pixels of the binarized circular pattern candidate and to compare it with a reference value thereof, as will be explained in detail later. Next, at step S106, pattern matching is performed on the circular pattern to be detected and the detected circular pattern candidate in the radial and circumferential directions, by taking rotation into account. Next, at step S107, it is calculated based on the check at steps S103 and S106 whether the circular pattern candidate matches the circular pattern to be detected.

Figure 4:
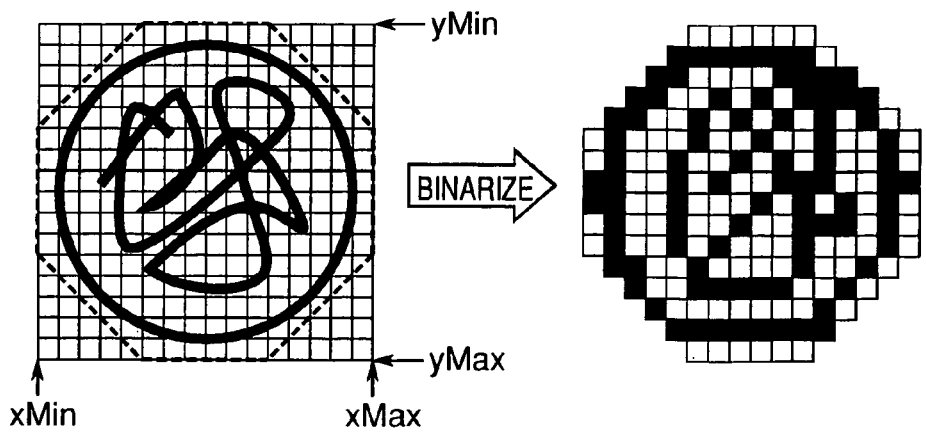
FIG. 4 is a diagram for illustrating a counting technique of specified pixels in an octagon.

Next, the counting of the specified pixels in the density check (step S105 in FIG. 3) is explained. The specified pixels of the circular pattern are counted in a polygon having n vertices (or n-polygon) (wherein n is larger than eight). The counting of the specified pixels in an octagon is explained with reference to FIG. 4. A detection window used in FIG. 4 has 16*16 pixels. When a circular pattern in the detection window as shown in the left side is binarized with respect to a predetermined color, data as shown in the right side is obtained.

Figure 5:
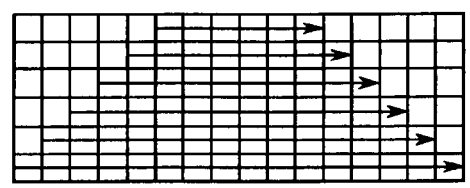
FIG. 5 is a diagram for illustrating a counting range for the specified pixels in an octagon.

FIG. 5 is provided to illustrate scanning of a third of the image from above in order to count the specified pixels of a circular pattern in an octagon. (A) At the first line, scanning is started from a pixel distant by five pixels from the left end and is stopped at a pixel distant by five pixels from the right end. At the second to sixth lines, the scanning range is increased by one pixel to the left and right directions for each line. That is, at the second line, scanning is started from a pixel distant by four pixels from the left end and is stopped at a pixel distant by four pixels from the right end. (B) At the seventh to tenth lines, scanning is performed from the left end to the right one. (C) At the eleventh to sixteenth lines, the scanning range is decreased by one pixel to the left and right directions for each line. That is, at the eleventh line, scanning is performed from the left end to the right one, and at the eleventh line, scanning is started from a pixel distant by one pixel from the left end and is stopped at a pixel distant by one pixel from the right end. Finally, at the sixteenth line, scanning is started from a pixel distant by five pixels from the left end and is stopped at a pixel distant by five pixels from the right end.

Figure 6:
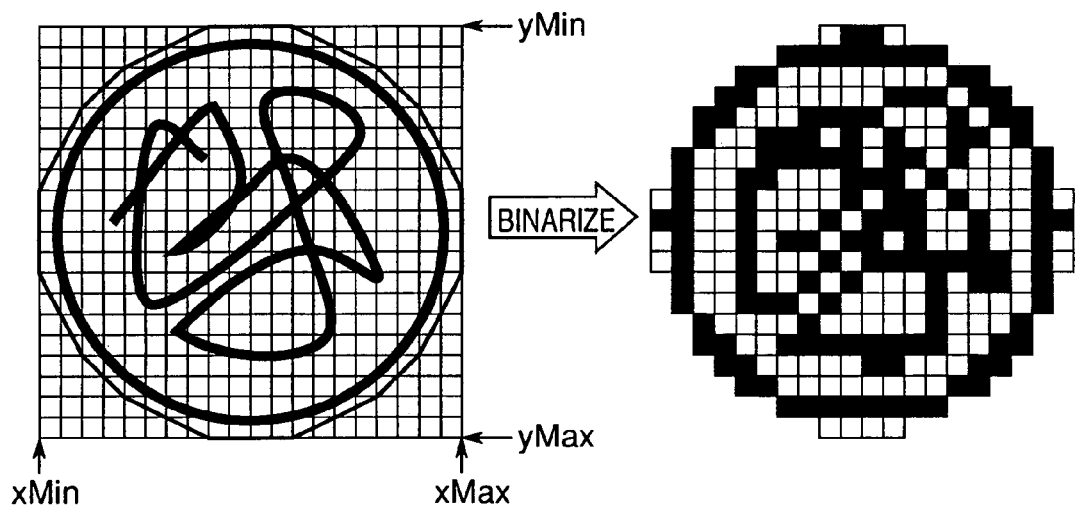
FIG. 6 is a diagram for illustrating a counting technique of specified pixels in a hexadecagon.
Figure 7:
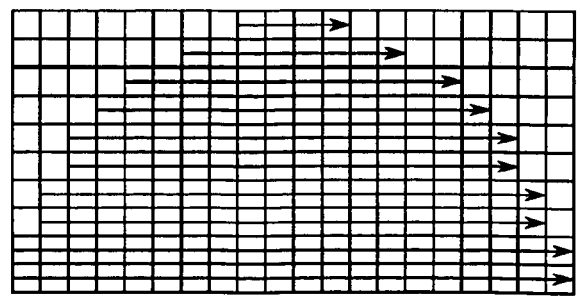
FIG. 7 is a diagram for illustrating a counting range for the specified pixels in a hexadecagon.

Next, the counting of specified pixels in an upper half in a hexadecagon is explained with reference to FIG. 6. A detection window used in FIG. 6 has 20*20 pixels. When a circular pattern in the detection window, as shown in the left side in FIG. 6, is binarized with respect to a predetermined color, data shown in the right side in FIG. 6 is obtained. FIG. 7 is provided to illustrate scanning of a third of the image from above in order to count the specified pixels of a circular pattern in an octagon. (A) At the first line, scanning is started from a pixel distant by eight pixels from the left end and is stopped at a pixel distant by eight pixels from the right end. (B) At the fourth line, the scanning range is increased by one pixels to the left and right directions for each line. (C) At the fifth to ninth lines, the scanning range is increased by one pixel to the left and right directions every two lines. (D) At the tenth line, the scanning is performed from the left end to the right end. Thus, the scanning is completed on the upper half. In the lower half, the scanning range is decreased symmetrically to the upper half.

Figure 8:
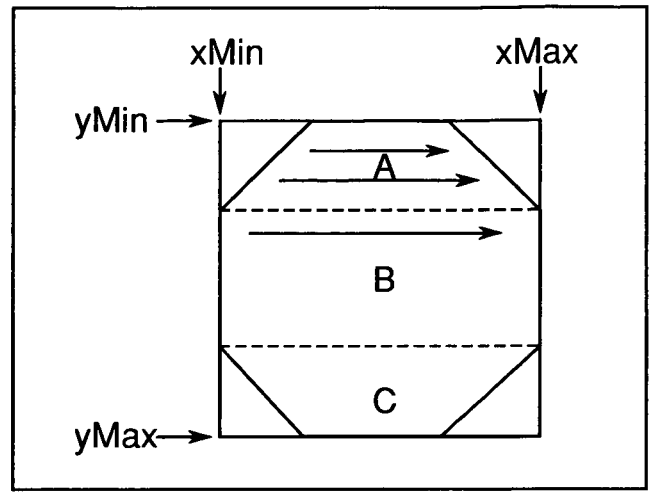
FIG. 8 is a diagram for explaining to count specified pixels in an octagon.
Figure 9:
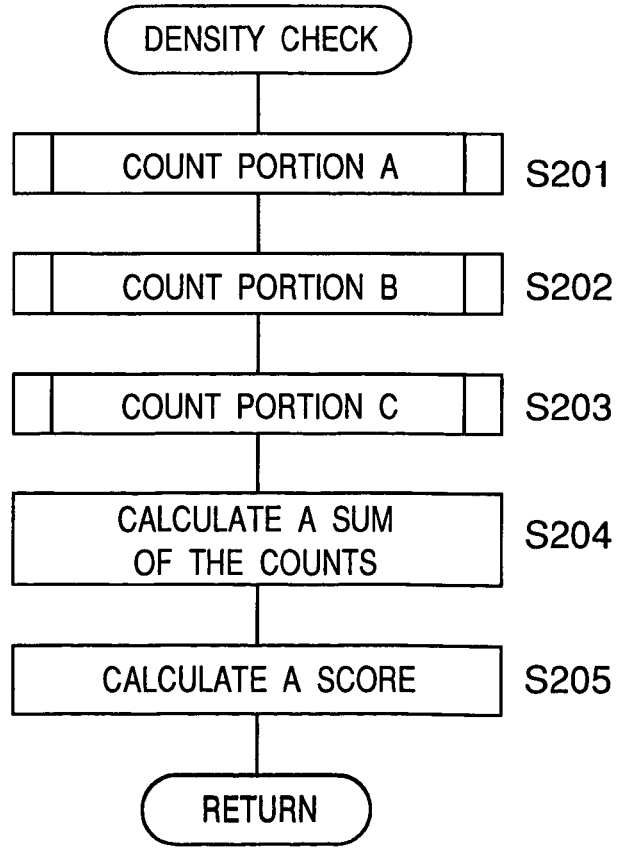
FIG. 9 is a flowchart of density check.
Figure 10:
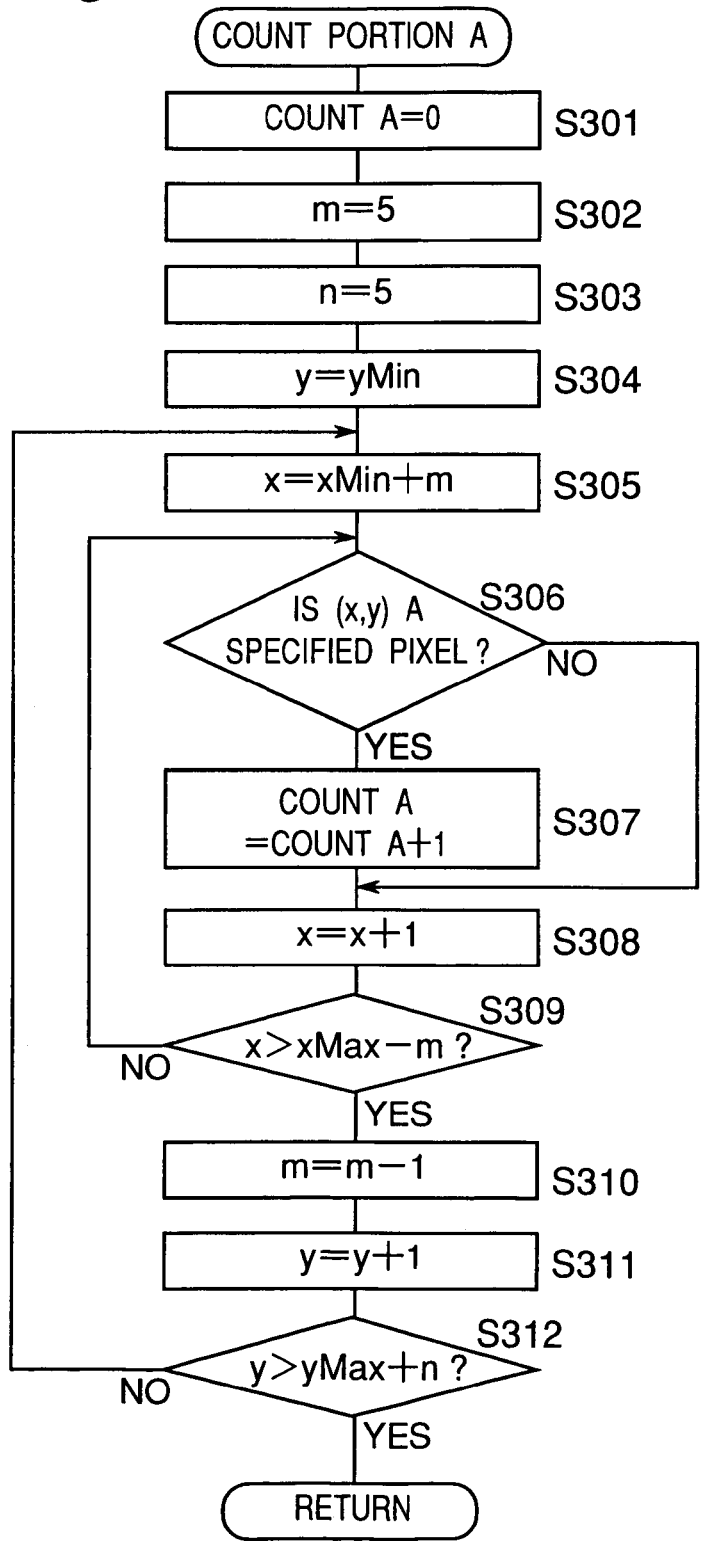
FIG. 10 is a flowchart of image processing to count specified pixels in portion A in FIG. 8.
Figure 11:
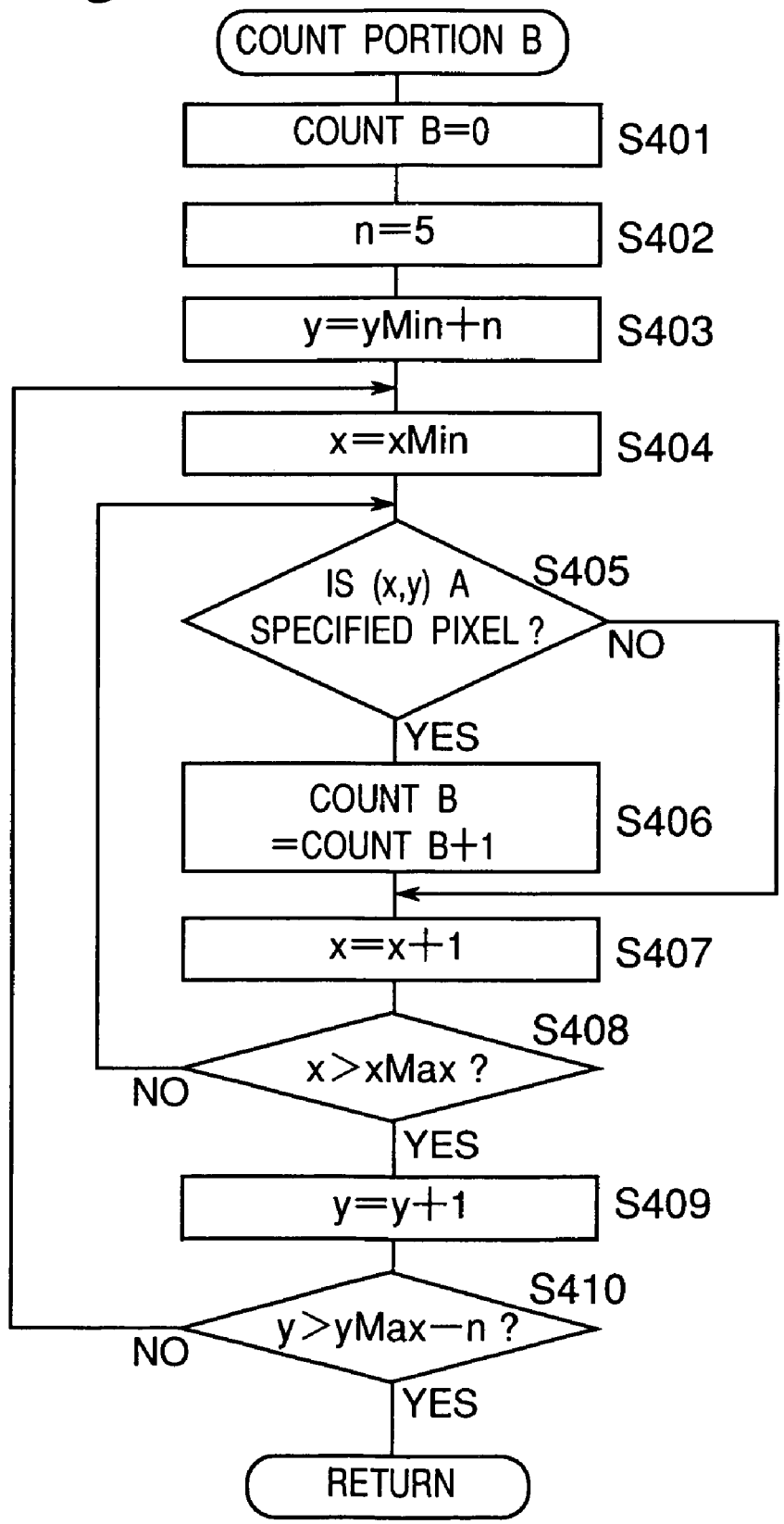
FIG. 11 is a flowchart of image processing to count specified pixels in portion B in FIG. 8.
Figure 12:
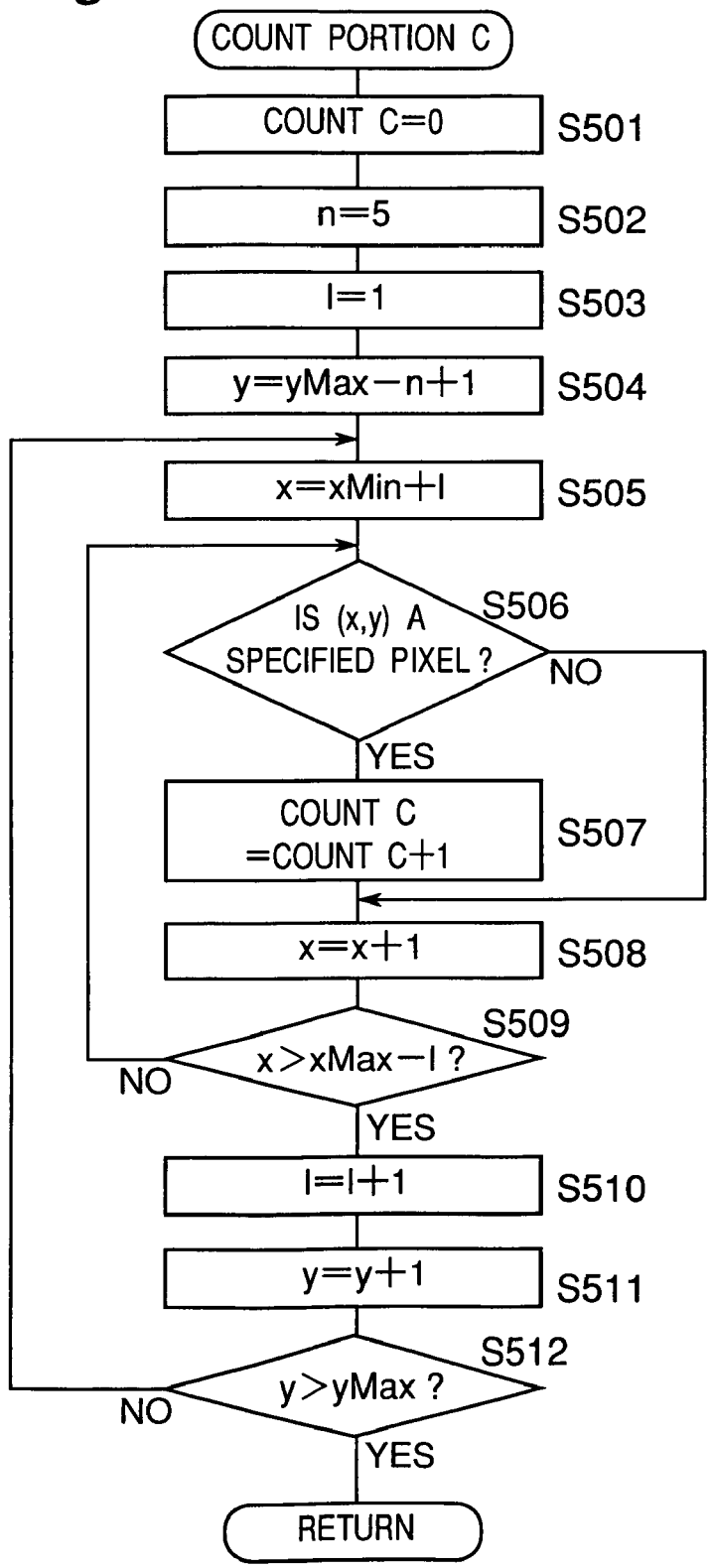
FIG. 12 is a flowchart of image processing to count specified pixels in portion C in FIG. 8.

Next, the density check is explained. As an example, specified pixels in an octagon are counted. FIG. 8 illustrates counting of specified pixels in an octagon. FIG. 9 shows a flowchart of the density check, and FIGS. 10, 11 and 12 are flowcharts on image processing for the counting for portions A, B and C shown in FIG. 8. First, specified pixels are counted in portion A (S201), specified pixels are counted in portion B (S202), and specified pixels are counted in portion C (S203). These counting processes are explained later in detail. Next, the specified pixels counted at steps S201 to S203 are summed to obtain a total sum of the specified pixels in the octagon (S204). Next, a score is obtained by comparing the total sum obtained at step S204 with a count of the specified pixels in the circular pattern to be detected (S205). Then, the flow returns to the flow shown in FIG. 3.

Next, the counting for portion A (step S201 in FIG. 9) is explained with reference to the flowchart shown in FIG. 10. First, initialization is performed at steps S301 to S305. First, count value A is reset to zero (S301). Next, variable m is set to five (S302), and variable n is set to five (S303). Further, variable y is set to yMin (S304), and variable x is set to xMin+m (S305). Thus, the initialization is completed. Next, it is decided whether a pixel at (x, y) is a specified pixel or not (S306). If the pixel is a specified pixel, count value A is incremented by one (S307). Next, in order to check a coordinate at the right side, x is incremented by one (S308), and it is decided whether x>xMax-m (S309), or whether (x, y) exceeds the right end. If it does not exceed the right end, the flow returns to step S306. If it exceeds the right end, m is set to m-1 (S310). Then, y is incremented by one (S311), and it is decided whether y is larger than yMax+n (S312) or whether the pixel (x, y) is outside the portion A or not. If it is not outside the portion A, the flow returns to step S305. If it is outside the portion A, the counting of the portion A is completed, and the flow returns to the flow shown in FIG. 9.

Next, the counting for portion B (FIG. 9, step S902) is explained with reference to the flowchart shown in FIG. 11. First, initialization is performed at steps S401 to S404. First, count value B is reset to zero (S401). Next, n is set to five (S402). Further, y is set to yMin+n (S403), and x is set to xMin (S404). Thus, the initialization is completed. Next, it is decided whether a pixel at (x, y) is a specified pixel or not (S405). If the pixel is a specified pixel, count value B is incremented by one (S406). Then, x is incremented by one (S407). Next, it is decided whether x>xMax (S408), or whether (x, y) exceeds the right end. If it does not exceed the right end, the flow returns to step S405. If it exceeds the right end, y is incremented by one (S409). Next, it is decided whether y is larger than yMax-n (S410) or whether the pixel (x, y) is outside the portion B or not. If it is not outside the portion B, the flow returns to step S404. If it is outside the portion B, the counting of the portion B is completed, and the flow returns to the flow shown in FIG. 9.

Next, the counting for portion C (FIG. 9, step S203) is explained with reference to the flowchart shown in FIG. 12. First, initialization is performed at steps S501 to S505. First, count value C is reset to zero (S501) Next, n is set to five (S502), and variable l is set to five (S503). Further, y is set to yMax-n+1 (S504), and x is set to xMin+l (S505). Thus, the initialization is completed. Next, it is decided whether a pixel at (x, y) is a specified pixel or not (S506). If the pixel is a specified pixel, count value C is incremented by one (S507). Next, in order check a coordinate at the right side, x is incremented by one (S508). Next, it is decided whether x>xMax-l (S509), or whether (x, y) exceeds the right end. If it does not exceed the right end, the flow returns to step S506. If it exceeds the right end, l is incremented by one (S510), and y is also incremented by one (S511). Next, it is decided whether y is larger than yMax (S512) or whether the pixel (x, y) is outside the portion C or not. If it is not outside the portion C, the flow returns to step S505. If it is outside the portion C, the counting of the portion C is completed, and the flow returns to the flow shown in FIG. 9.

It is to be noted that a specified pixel may be an on-pixel or an off-pixel. Further, as explained above with reference to FIG. 7, it is possible to count the specified pixels in upper and lower halves in a hexadecagon symmetrically relative to the center thereof. The shape of the polygon is not limited to an octagon or a hecadecagon. For example, it may be a polygon having 32 vertices. Further, in this embodiment, the counting is performed in the order of the portions A, B and C in an octagon. However, the order of counting is not limited to the above one, and a different order may be used.

Therefore, the above-mentioned image processing according to this embodiment can shorten the processing time because the number of pixels to be checked is decreased in a polygon of n vertices (n being equal to or larger than 8) than in a rectangular area. Further, an error of area of an octagon and a circle is only 4%, while that between a rectangle and a circle is 22%, while. Therefore, the precision becomes higher. Further, the processing to count the specified pixels is simpler in a polygon than in a circular area. To sum up, in this embodiment, a circular pattern in an image can be detected at a higher speed and at a higher precision because the specified pixels can be counted more simply in a polygonal area than in a circular area.

Figure 13:
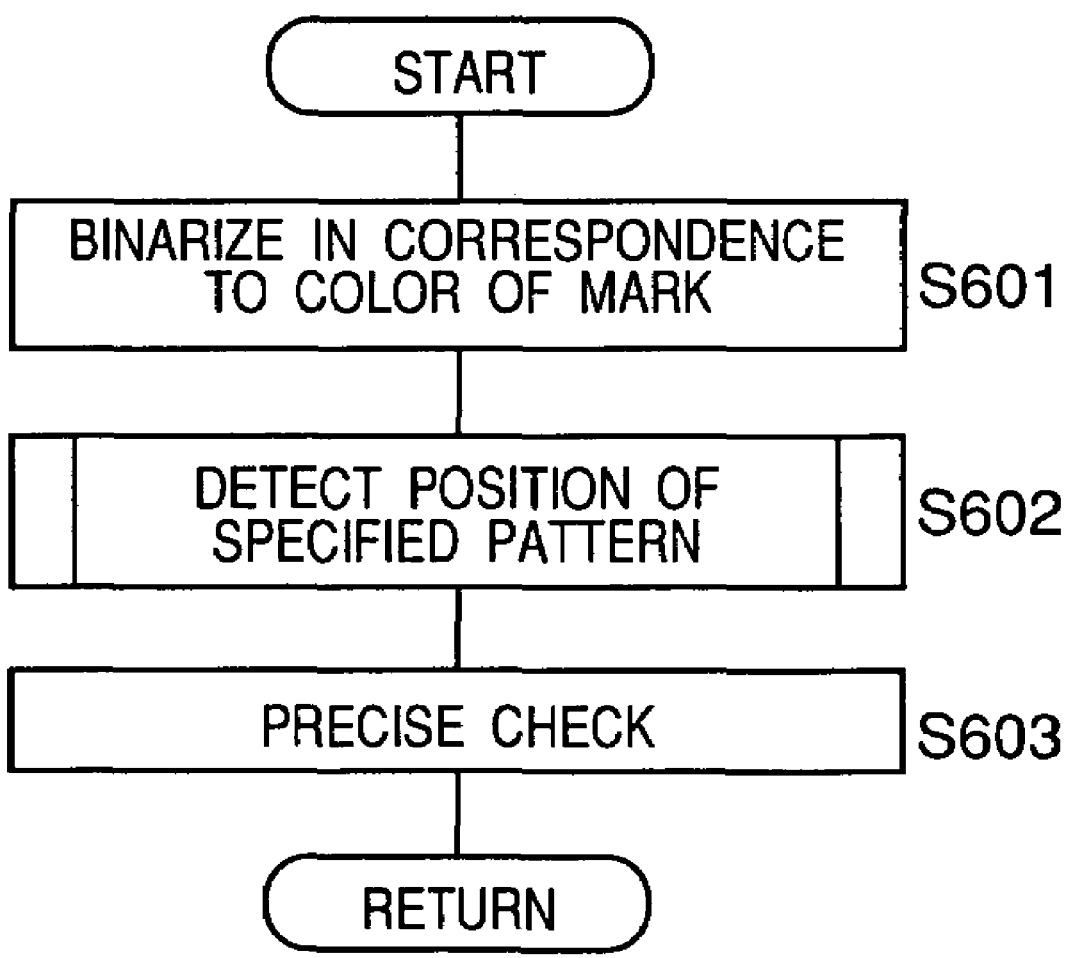
FIG. 13 is a flowchart of a main routine of the controller of a second embodiment of the invention.

Next, a second embodiment of the invention is explained. FIG. 13 shows a main routine executed by the CPU 201 in the controller 1 of a system according to the second embodiment. Input image data processed by this system are 8-bit (256-gradation) density data of red (R), green (G) and blue (B). The image data are obtained by various input means as shown in FIG. 2 and are subjected to preprocessing such as resolution conversion or change in modification factor, if necessary. At step S601, the image data are subjected to binarization according to the color of a circular pattern (mark) to be detected. If the density value of a pixel in the image is within a predetermined reference density range on the color of the circular pattern, the pixel is decided as an on-pixel having value of one, otherwise it is decided as an off-pixel having value of zero. Next, at step S602, the position of a specified pattern is detected, as will be explained in detail later. Then, at step S603, the circular pattern detected at step S602 is checked carefully whether it is true or not. Thus, it is decided whether it is a specified pattern to be detected.

Figure 14:
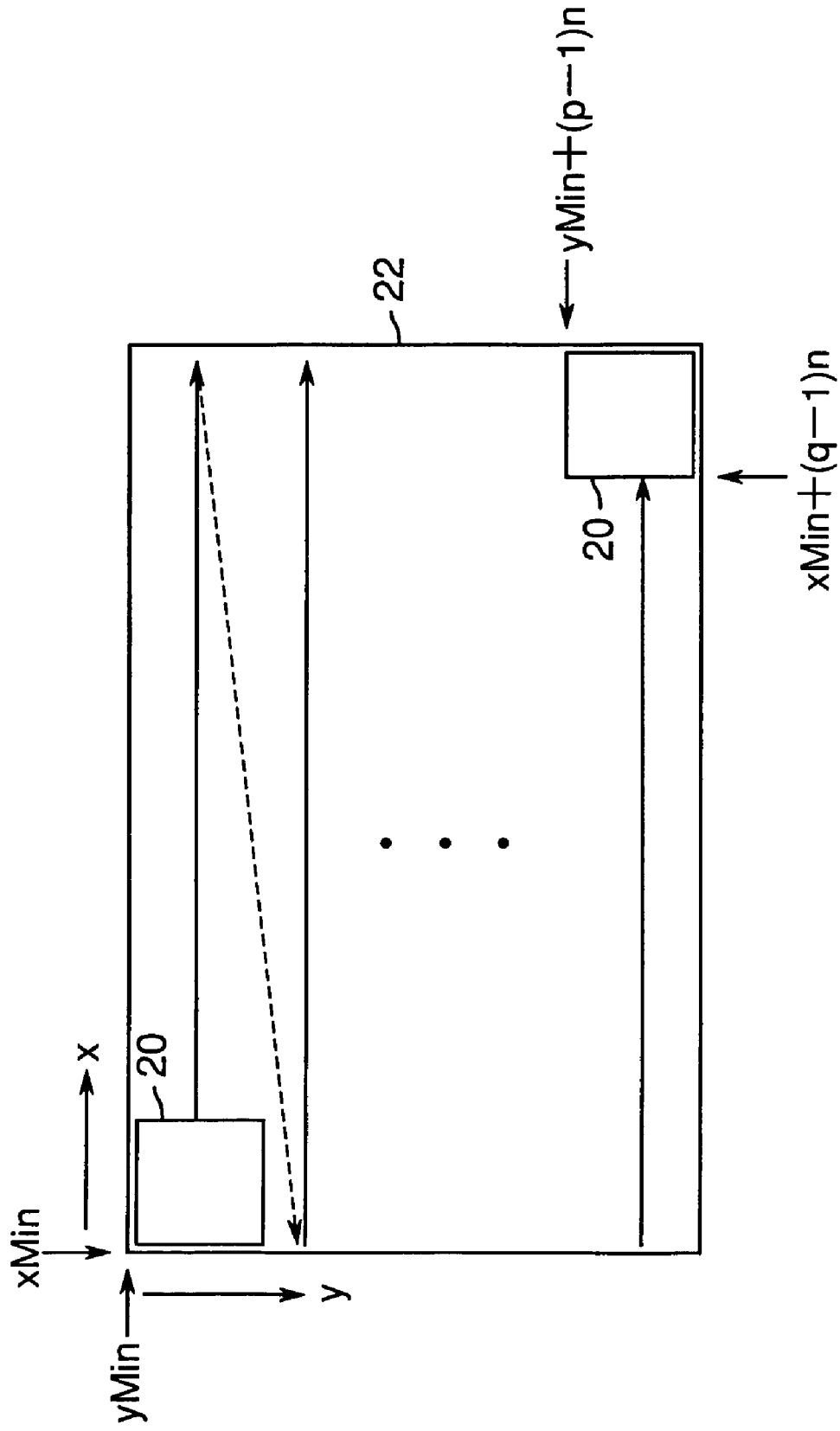
FIG. 14 is a diagram for explaining movement of a detection window in an area of partial image.

Next, movement of a detection window is explained. FIG. 14 illustrates the movement of detection window in a partial image area. A partial image area 22 is extracted from the total area of the bi-level image. The partial image area in FIG. 14 has a maximum size which cannot include two or more specified patterns to be detected. The detection window 20 has a length longer by n pixels than the specified pattern to be detected. The partial image area 22 has a horizontal length including q detection windows 20 each displaced by n pixels in x direction and a vertical length including p detection windows 20 each displaced by n pixels in y direction, where p, q and n are natural numbers.

As shown in FIG. 14, when the specified pattern is detected, the detection window 20 is moved by n or 2n pixels in x direction from the top leftmost end in the partial image area 22. When it reaches the right end, it is returned to the left end and is moved by n pixels in y direction. Then, it is moved similarly by n or 2n pixels in x direction. This is repeated until the detection window 20 reaches the bottom rightmost end in the partial image area 22. The detection window 20 shown in FIG. 4 positioned at the top leftmost end detects different pixels from that positioned at the bottom rightmost end, for the clarity of illustration. Actually, the detection window 20 has a much larger size, so that most of the pixels detected at the two positions are common.

Figure 15A:
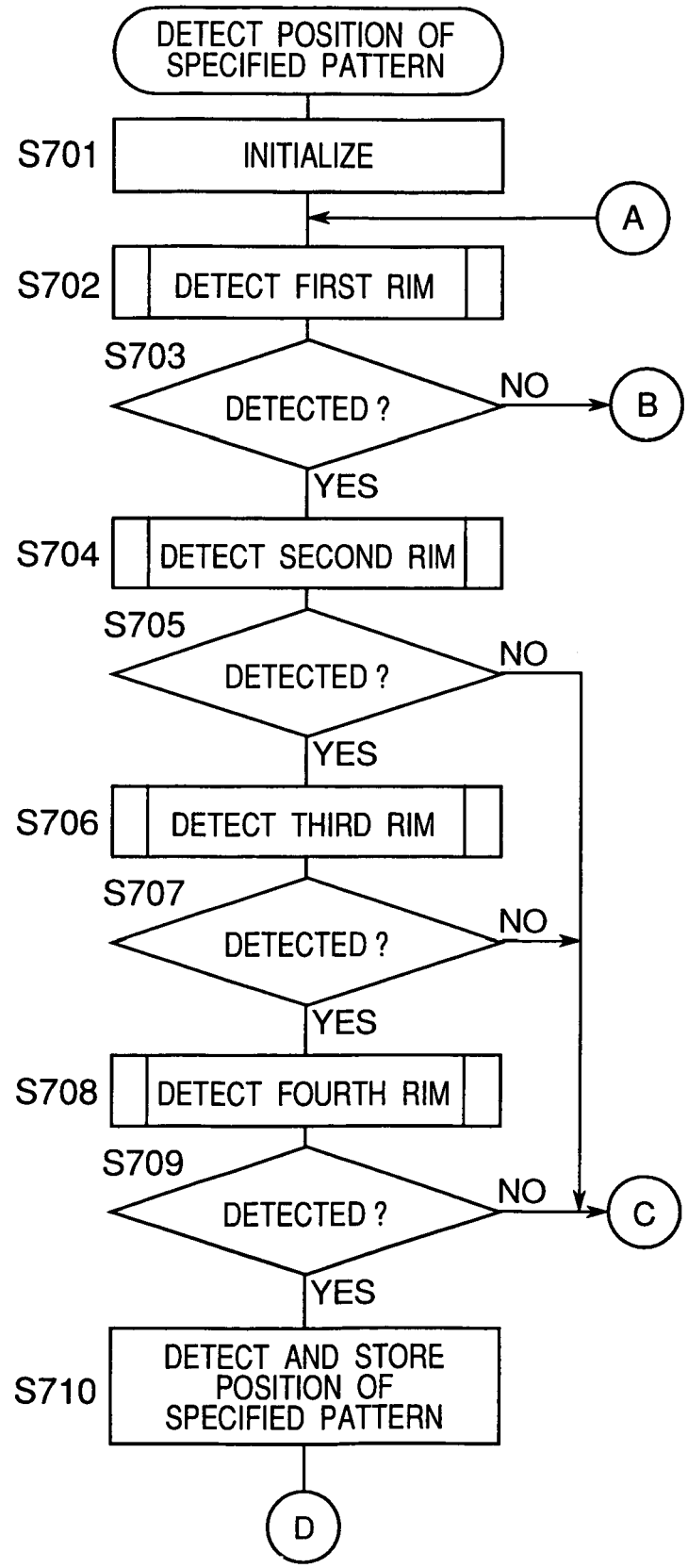
FIGS. 15A and 15B are flowcharts of image processing for detecting a position of a specified pattern.
Figure 15B:
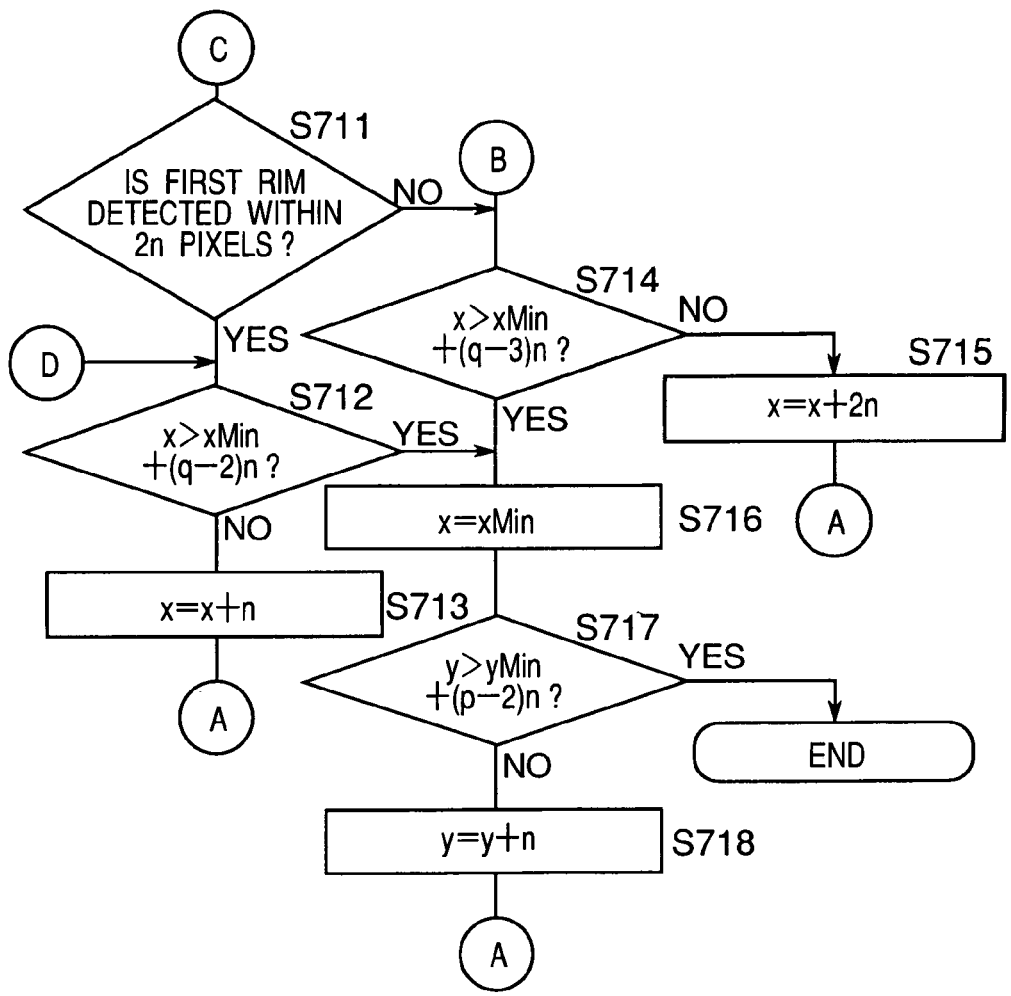

Next, the detection of position of specified pattern (step 302 in FIG. 13) is explained. FIGS. 15A and 15B show a flow of image processing for detecting a position of the specified pattern. As explained above, the image data to be processed in this processing are bi-level data obtained by the binarization on the color or the specified pattern (mark). The position of the specified pattern is detected in the partial image area 22 which is a part of the total bi-level image.

Figure 16:
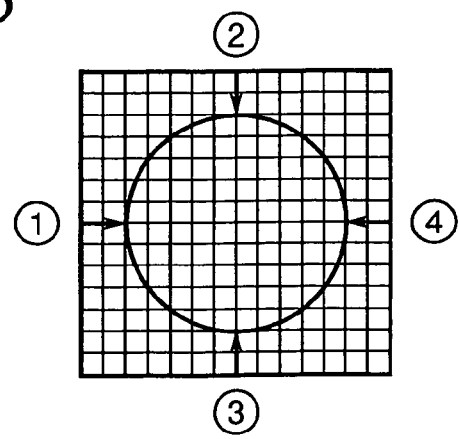
FIG. 16 is a diagram of explaining first to fourth detection directions when a rim of a specified pattern from sides of the detection window.

First, initialization is performed (S701). For example, the detection window 20 is set at the top leftmost position in the partial image area, and the position (x, y) at the top leftmost position is set to (xMin, yMin). FIG. 16 shows detection directions for detecting a rim of a pattern of a specified pattern from a side of the detection window. Next, a rim of a specified pattern is detected in the first to fourth directions. As shown in FIG. 16, the first direction is from the left side to the center of the detection window 20. Second, third and fourth directions are from the top side to the center, from the bottom side to the center and from the right side to the center of the detection window 20, respectively. First, detection of a rim is started in the detection window 20 in the first direction (S702), and it is decided whether a rim is detected in the first direction or not (S703). If a rim is detected, detection of a rim is started again in the second direction in the detection window 20 (S704). On the other hand, if no rim is detected in the second direction, the flow proceeds to step S714. If a rim is detected in the second direction (S705), detection of a rim is started further in the third direction in the detection window 20 (S706). On the other hand, if no rim is detected in the second direction, the flow proceeds to step S711. If a rim is detected in the second direction, it is decided whether a rim is detected in the third direction or not (S707). If a rim is detected in the third direction, detection of a rim is started in the fourth direction in the detection window 20 (S708). On the other hand, if no rim is detected in the third direction, the flow proceeds to step S711. It is decided whether a rim is detected in the fourth direction or not (S709), and if a rim is detected in the fourth direction, the position of the specified pattern is detected, and the detected position is stored in the RAM 204 or the like (S710). Then, the flow proceeds to step S712. On the other hand, if no rim is detected in the fourth direction, the flow proceeds to step S711. The detection at steps S702, S704, S706 and S708 will be explained later in detail.

Figure 17A:
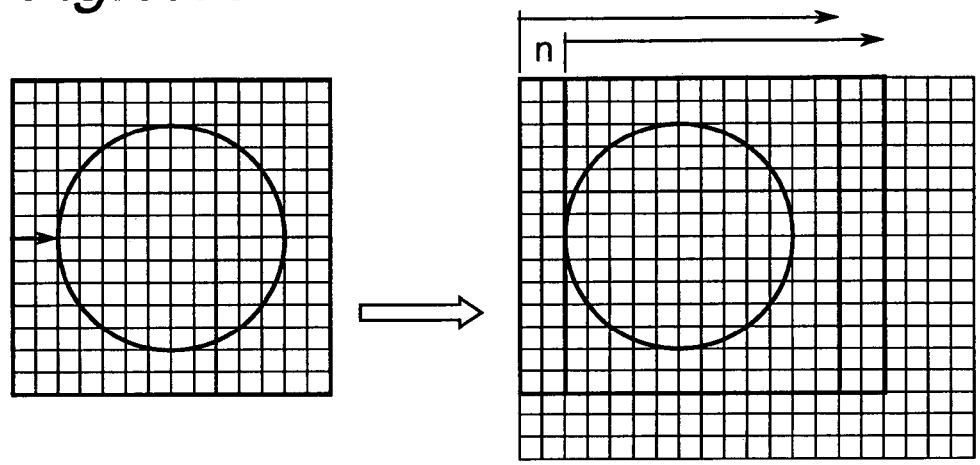
FIGS. 17A and 17B are diagrams for explaining change of moving distance of the detection window.
Figure 17B:
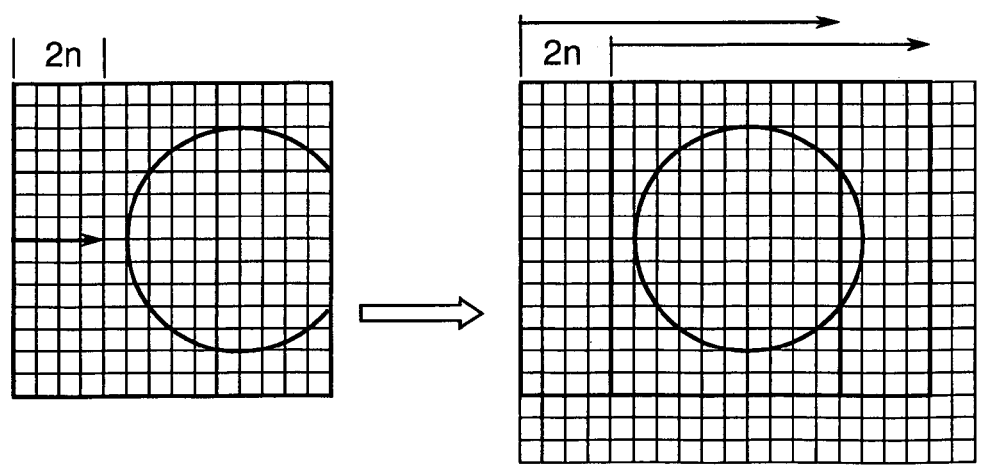

Before explaining the flow of FIG. 15B, moving distance of the detection window 20 is explained. FIGS. 17A and 18B illustrate change in moving distance of the detection window. If a rim is not detected in any of the first to fourth directions (FIG. 16), the detection window 20 is moved, and it is started again to detect a rim in the order of the first to fourth directions. When the detection window 20 is moved, the moving distance is changed according to the result of rim detection in the first direction of the detection window 20. FIG. 17A shows the movement of the detection window 20 when a rim is detected until the depth of 2n pixels. In this case, the detection window 20 is moved by n pixels in right direction. FIG. 17B shows the movement of the detection window 20 when a rim is not detected until the depth of 2n pixels. In this case, the detection window 20 is moved by 2n pixels in right direction. Because the detection window 20 has a size larger by about n pixels than the horizontal width of the specified pattern, when a rim is not detected to the depth of 2n pixels in the first direction, it is apparent that a rim will not be detected at least in the fourth direction of the detection window 20. Then, by omitting the detection of a rim in such directions where a rim will not be detected, the position detection of the specified pattern can be processed at a higher speed. It is to be noted that "depth" denotes width of scanning from a side to the center of the window.

In the above-mentioned flow shown in FIG. 15A, the rim is detected in the order of the first, second, third and fourth directions. However, the order is not limited in this case. When the detection window is moved in x direction or in the main scan direction, if the first direction is adopted first, any order of the other directions, or the second to fourth directions, may be used.

Returning to FIG. 15B, step S711 is performed when it is decided at step S705, S707 or S709 that a rim is detected in the first direction, but not in the second, third or fourth direction. In such a case, it is decided whether the detection window 20 is moved by n pixels or by 2n pixels in the first direction of the detection window 20. That is, it is decided whether the rim is detected within 2n pixels in the first direction (S711). When the rim is detected within 2n pixels, the flow proceeds to step S712. As mentioned above, step S712 is also performed when the position of the specified pattern is detected and stored. In these cases, at step S712, it is decided whether the x coordinate of the detection window 20 at the top leftmost position has a relationship that $x > x\text{Min} + (q-2)*n,$ or whether the detection window 20 exists at a position at less than n pixels to the right end of the partial image area 22. On the other hand, if it is decided that the rim is not detected to the depth smaller than 2n pixels, the flow proceeds to step S714. If it is decided that the detection window 20 exists at a position at less than n pixels to the right end of the partial image area 22, the x coordinate at the top leftmost position of the detection widow is set to x+n. That is, the detection window 20 is moved by n pixel in the right direction (S713). Then, the flow returns to step S702.

As mentioned above, step 714 is performed when it is decided at step S703 that a rim is not detected, or when it is decided at step S711 that the rim is detected within 2n pixels in the first direction of the detection window 20. In such a case, it is decided at step S714 whether the x coordinate of the detection window 20 at the top leftmost position has a relationship that $x > x\text{Min} + (q-3)*n,$ or whether the detection window 20 exists at a position at less than 2n pixels to the right end of the partial image area 22. If it is not decided that the detection window 20 exists at position at less than 2n pixels to the right end of the partial image area 22, the x coordinate at the top leftmost position of the detection window is set to x+2n (S715), and the flow returns to step S702. On the other hand, if it is decided at step S714 that the detection window 20 exists at a position at less than 2n pixels to the right end of the partial image area 22, the flow proceeds to step S716. Step S716 is performed when it is decided at step S712 that the detection window 20 exists at a position at less than n pixels to the right end of the partial image area 22, or when it is decided at step S714 that the detection window 20 exists at a position at less than 2n pixels to the right end of the partial image area 22. At step S716, the top leftmost x coordinate of the detection window 20 is set to xMin, or to the left end position. Then, it is decided whether the y coordinate of the detection window 20 at the top leftmost position has a relationship that $$y>y\text{Min}+(p-2)*n,$$

or whether the detection window 20 exists at a position at less than n pixels to the bottom end of the partial image area 22 (S717). If it is decided that the detection window 20 exists at a position at less than n pixels to the bottom end of the partial image area 22, the detection of the position of the specified pattern is completed. Otherwise, the y coordinate at the top leftmost position of the detection widow is set to y+n (S718), and the flow returns to step S702. The above-mentioned steps are repeated until all the area is scanned in the partial image area 22.

Figure 18:
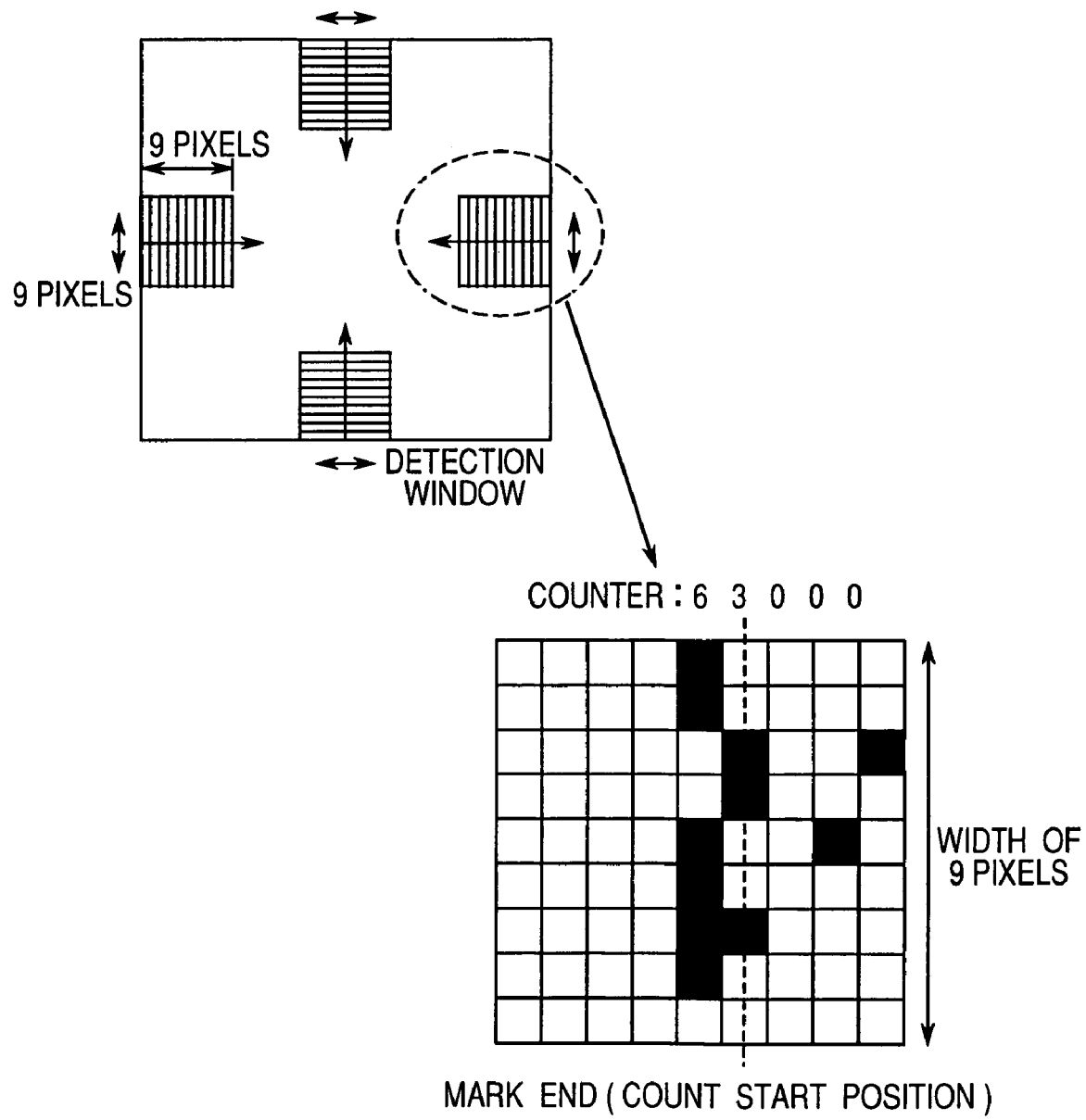
FIG. 18 is a diagram for explaining detection of a rim of a specified pattern.

Next, the detection of a rim of a specified pattern is explained with reference to FIG. 18. In the detection, as shown in FIG. 18, scanning is performed on nine central pixels in each side of the detection window 20 to the depth of nine pixels towards the center of the detection window 20. In this example, the scanning is performed to the depth of nine pixels. When the width of the specified pattern is longer by about n pixels than the width of the detection window, it is appropriate that the moving distance of the detection is n or 2n pixels. If n is 4, the scanning is appropriate to be performed to the depth of (2n+1) or 9 pixels.

A rim of a specified pattern is detected according to following steps.
(1) Counting is started when two or more on-pixels are detected in the nine pixels.
(2) If any on-pixels is detected in the nine pixels after starting the count, it is counted.
(3) If the count is equal to or larger than four, the counting is stopped, and the start position of the counting is set as a rim of the specified pattern.
(4) On the other hand, if the count is smaller than four even at the position of nine pixels from the side of the detection window 20, it is decided that a rim is not detected.

In the lower half in FIG. 18, an example of scan is shown from the right direction in the width of nine pixels. In the pixels at the depth of one, only one on-pixel exists in the nine pixels. Therefore, it is not counted. In the pixels of the depth of three, there is no on-pixel, and the counting is not performed eventually. In the pixels at the depth of four, there are three on-pixels. Then, the counting is started from the pixels at the depth of four. In the pixels at the depth of five, there are six on-pixels. Then, the total count is ten. Then, it is concluded that a rim of the specified pattern is detected at the depth of four.

Figure 19:
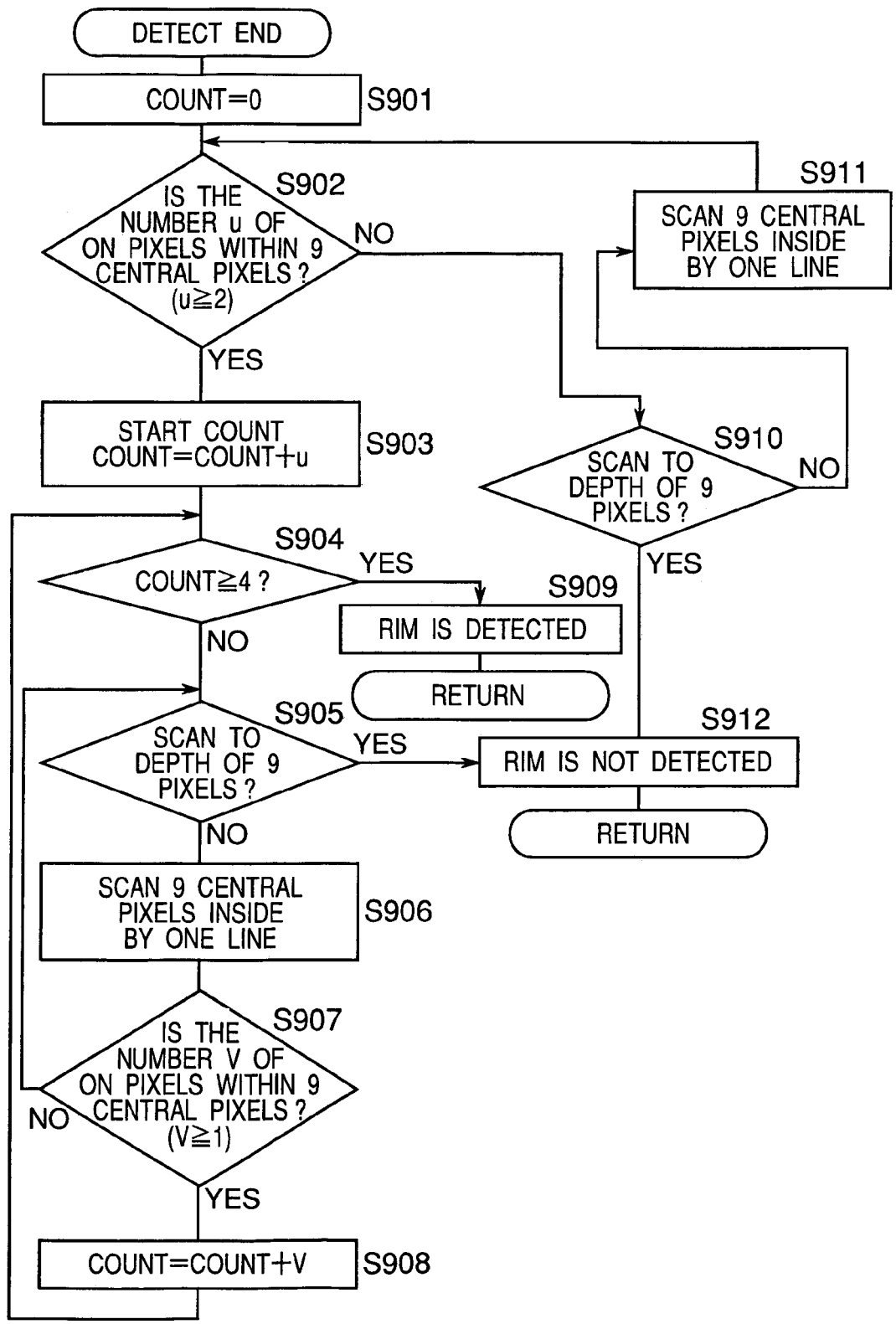
FIG. 19 is a flowchart for detection of a rim of a specified pattern.

Next, the detection of a rim in the first, second, third or fourth direction of the detection window 20 (steps S702, S704, S706 or S708) is explained with reference to a flowchart shown in FIG. 19 of the subroutine for detecting a rim of the specified pattern. First, the count is reset to zero (S901). Next, it is decided whether there are u on-pixels (u≧2) in the central nine pixels or not (S902). If it is decided that there are u pixels, counting is started (S903). That is, count=count+u. On the other hand, if the number of on-pixels is smaller than u, the flow proceeds to step S910.

Next, it is decided at step S904 whether the total count is equal to or larger than four. If the total count is equal to or larger than four, it is decided that a rim of the specified pattern is detected (S909), and the flow returns to the subroutine shown in FIGS. 15A and 15B. If the total count is smaller than four, it is decided whether scan is completed to the depth of nine pixels (S905). If it is decided that scan is completed to the depth of nine pixels, it is decided that a rim of the specified pattern is not detected (S912), and the flow returns to the subroutine shown in FIGS. 15A and 15B. On the other hand, if the scanning is not yet performed to the depth of nine pixels (NO at step S905), the central nine pixels in a line located inside by one pixel are scanned (S906). Next, it is decided whether there are v on-pixels (v≧1) in the central nine pixels (S907). If the number of on-pixels is smaller than v, the flow returns to step S905. On the other hand, if there are one or more on-pixels, the count is incremented by v (S908), and the flow proceeds to step S904.

If it is not decided at step S902 that there are u pixels, it is decided at step S910 whether the scanning is performed to the depth of nine pixels or not (S910). If the scanning is performed to the depth of nine pixels, it is decided that a rim is not detected (S912), and the flow returns to the flow shown in FIGS. 15A and 15B. If the scanning is not yet performed to the depth of nine pixels, the central nine pixels in a line located inside by one pixel are scanned (S911), and the flow returns to step S902.

In the above-mentioned example, when the detection window 20 is moved in the main scan or x direction to reach the right end of the partial image area 22, it is moved back to the left end of the partial image area 20 and is moved by n pixels in y direction. Then, it is moved in the main scan or x direction. This is repeated to detect a rim of a specified pattern, and the position of the specified pattern is determined. Thus, rims and a position of the specified pattern can be detected. However, the detection is not limited to this procedure. For example, the detection window 20 may be moved in the subscan or y direction. When the detection window 20 reaches the bottom end of the partial image area 22, the detection window is moved back to the top end and is moved by n pixels in x direction. Then, it is moved again in y direction. Thus, rims and a position of the specified pattern can be detected. Further, when a rim of the detection pattern is detected by moving the detection window in y direction, in the order to the detection of a rim, the detection in the second direction has to be performed first. However, as to the order of the detection in the other directions, any order may be adopted. Further, the moving distance of the detection window 20 is determined based on the detection result of a rim in the second direction. Thus, it is possible to detect a rim by moving the detection window in y direction.

Though FIGS. 16 and 17 illustrate detection of a rim of a circle, the invention may also be applied to detect a rim of a pattern different from a circle. Further, detection of a rim of a specified pattern other than a circle is possible by increasing or decreasing the number of central on-pixels to be detected, or by changing the depth of the scanning.

Further, the shape of the detection window is not limited to a quadrilateral or a square. It may be a polygon other than a quadrilateral. For example, the shape of a pixel is a hexagon, and the detection window is also a hexagon. Then a rim can be detected in six directions.

An advantage of the second embodiment is that the detection of a specified pattern can be performed at higher speed by changing the order of the detection of a rim of the specified pattern according to the moving direction of the detection window and by canceling the detection when a rim is decided not to be detected in any one direction to move the detection window to a next position. Further, when a rim of the specified pattern is not detected, the moving distance is changed according to the depth of the scanning. Therefore, waste time is reduced, and the processing speed is improved.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processor for detecting a circular pattern in an image comprising:
   a binarization unit which binarizes input image data to provide bi-level image data;
   a counter which counts pixels having a predetermined value in a block of a polygon having n vertices in the bi-level image data, wherein n denotes a natural number equal to or larger than eight; and
   a controller which decides, based on a number of the pixels having the predetermined value counted by said counter, whether the circular pattern is detected in the image or not.

2. The image processor according to claim 1, wherein the polygon is an octagon.

3. The image processor according to claim 1, wherein the polygon is a hexadecagon.

4. The image processor according to claim 1, wherein the predetermined value in the bi-level image data is one.

5. The image processor according to claim 1, wherein the predetermined value in the bi-level image data is zero.

6. A method of image processing to detect a circular pattern in an image comprising the steps of:
   binarizing input image data to provide bi-level image data;
   counting pixels having a predetermined value in a block of a polygon having n vertices in the bi-level image data, wherein n denotes a natural number equal to or larger than eight; and
   deciding, based on a number of the pixels having the predetermined value, whether the circular pattern is detected in the image or not.

7. The method according to claim 6, wherein the polygon is an octagon.

8. The method according to claim 6, wherein the predetermined value in the bi-level image is one.

9. A recording medium storing a program to be executed by a computer, the program comprising the steps of:
   binarizing input image data to provide bi-level image data;
   counting pixels having a predetermined value in a block of a polygon having n vertices in the bi-level image data, wherein n denotes a natural number equal to or larger than eight; and
   deciding, based on a number of the pixels having the predetermined value, whether the circular pattern is detected in the image or not.

10. The recording medium according to claim 9, wherein the polygon is an octagon.

11. The recording medium according to claim 9, wherein the predetermined value in the bi-level image is one.

12. An image processor for detecting a specified pattern in an image comprising:
    a controller which sets a detection window in input image data to detect the specified pattern and moves the detection window successively by a predetermined number of pixels; and
    a detector which scans the image data from each side of the detection window towards the center thereof to detect a rim of the specified pattern;
    wherein said controller decides a width of scan until which said detector detects a rim of the specified pattern, in a direction in correspondence to the moving direction of the detection window, and changes a moving distance of the detection window based on the decided width of scan.

13. The image processor according to claim 12, wherein the detection window is a quadrilateral window, and said detector scans in directions from four sides of the detection window towards the center thereof to detect a rim of the specified pattern.

14. The image processor according to claim 12, wherein the image data are bi-level image data obtained by binarization with respect to color of the specified pattern.

15. An image processor for detecting a specified pattern in an image comprising:
    a controller which sets a quadrilateral detection window to detect the specified pattern and moves the detection window successively by a predetermined number of pixels; and
    a detector which scans the image from each side of the detection window towards the center thereof to detect a rim of the specified pattern;
    wherein said detector detects the rim of the specified pattern first in a moving direction of the detection window and next in a direction vertical to the moving direction.

16. The image processor according to claim 15, wherein said controller decides a width of scan, until which said detector detects the rim of the specified pattern, in a direction in correspondence to the moving direction of the detection window, and changes a moving distance of the detection window based on the decided width of scan.

17. The image processor according to claim 15, wherein when a rim of the specified pattern is not detected in the moving direction of the detection window, said detector cancels detection of a rim of the specified pattern in a direction different from the moving direction.

18. The image processor according to claim 15, wherein the image data are bi-level image data obtained by binarization with respect to a color of the specified pattern.

19. A method of image processing to detect a specified pattern in an image comprising the steps of:
    setting a detection window to detect the specified pattern and moving the detection window successively by a predetermined number of pixels;
    scanning the image from each side of the detection window towards the center thereof to detect a rim of the specified pattern;
    deciding a width of scan until the rim of the specified pattern is detected, in a direction in correspondence to the moving direction of the detection window; and
    changing a moving distance of the detection window based on the decided width of scan.

20. A recording medium storing a program to be executed by a computer, the program comprising the steps of:
    setting a detection window to detect the specified pattern and moving the detection window successively by a predetermined number of pixels;
    scanning the image from each side of the detection window towards the center thereof to detect a rim of the specified pattern;
    deciding a width of scan until the rim of the specified pattern is detected, in a direction in correspondence to the moving direction of the detection window; and changing a moving distance of the detection window based on the decided width of scan.

21. A method of image processing to detect a specified pattern in an image comprising the steps of:
setting a quadrilateral detection window to detect the specified pattern and moving the detection window successively by a predetermined number of pixels; and
scanning the image from each side of the detection window towards the center thereof to detect a rim of the specified pattern;
wherein the rim of the specified pattern is detected first in a moving direction of the detection window and next in a direction vertical to the moving direction.

22. A recording medium storing a program to be executed by a computer, the program comprising the steps of:
setting a quadrilateral detection window to detect the specified pattern and moving the detection window successively by a predetermined number of pixels; and
scanning the image from each side of the detection window towards the center thereof to detect a rim of the specified pattern;
wherein the rim of the specified pattern is detected first in a moving direction of the detection window and next in a direction vertical to the moving direction.

* * * * *